US010755320B2

(12) United States Patent
Liu et al.

(10) Patent No.: US 10,755,320 B2
(45) Date of Patent: Aug. 25, 2020

(54) ADVERTISEMENT AUDIENCE DYNAMICAL DETECTION CIRCUIT, COMPUTER PROGRAM PRODUCT, AND RELATED METHOD FOR ESTIMATING QUANTITY OF OUT-OF-HOME (OOH) ADVERTISEMENT AUDIENCES PASSING THROUGH SPECIFIC LOCATION IN SPECIFIC TIME PERIOD

(71) Applicant: AirTag Technology Co., Ltd., New Taipei (TW)

(72) Inventors: Shih-Hao Liu, New Taipei (TW); Chang-Hung Ku, New Taipei (TW); Shao-Chi Chang, Hualien County (TW)

(73) Assignee: AIRTAG TECHNOLOGY CO., LTD., New Taipei (TW)

( * ) Notice: Subject to any disclaimer, the term of this patent is extended or adjusted under 35 U.S.C. 154(b) by 211 days.

(21) Appl. No.: 16/023,778

(22) Filed: Jun. 29, 2018

(65) Prior Publication Data
US 2019/0005550 A1    Jan. 3, 2019

(30) Foreign Application Priority Data
Jun. 30, 2017    (TW) .............................. 106122022 A

(51) Int. Cl.
*H04L 12/28*    (2006.01)
*G06Q 30/02*    (2012.01)
(Continued)

(52) U.S. Cl.
CPC ..... *G06Q 30/0272* (2013.01); *G06Q 30/0246* (2013.01); *H04W 4/021* (2013.01); *H04W 4/029* (2018.02)

(58) Field of Classification Search
CPC ....................................................... H04L 12/50
(Continued)

(56) References Cited

U.S. PATENT DOCUMENTS

2019/0005550 A1*    1/2019 Liu .................... G06Q 30/0246

FOREIGN PATENT DOCUMENTS

JP    2012-98990 A    5/2012

OTHER PUBLICATIONS

Translation of JP5281064, 30 pages, May 2012.*
(Continued)

*Primary Examiner* — Dang T Ton
(74) *Attorney, Agent, or Firm* — Birch, Stewart, Kolasch & Birch, LLP

(57) ABSTRACT

A computer program product enables an advertisement audience dynamical detection circuit to conduct an advertisement audience quantity detecting operation. The advertisement audience quantity detecting operation includes: receiving a probe request frame transmitted from other wireless communication device; recording the arrival time of the probe request frame; inspecting the frame field configuration of the probe request frame; allocating the probe request to a corresponding data group according to the arrival time and frame field configuration of the probe request frame and a sequence control value in the header of the probe request frame while ensuring all probe request frames in the same data group have same frame field configuration; and calculating an estimated quantity of advertisement audiences passing through a specific location in a specific time period based on a total quantity of resulting data groups.

10 Claims, 4 Drawing Sheets

(51) Int. Cl.
*H04W 4/029* (2018.01)
*H04W 4/021* (2018.01)

(58) Field of Classification Search
USPC .......................................................... 370/329
See application file for complete search history.

(56) References Cited

OTHER PUBLICATIONS

Japanese Office Action, dated Jan. 28, 2020, for Japanese Application No. 2018-207912, with an English translation.
Nakata of al., "Congestion Degree Estimation using Probe Request in Wireless LAN, IPSJ SIG Technical Report", DPS-175, MBL-87, vol. 2018, No. 1, May 24, 2018, pp. 1-7 (8 pages), with abstract.
Office Action issued on 106122022 for Taiwanese Patent Application No. dated Jun. 20, 2018.
Office Action issued on 106122022 for Taiwanese Patent Application No. dated May 8, 2018.
Vanhoef et al., "Why MAC Address Randomization is not Enough: An Analysis of Wi-Fi Network Discovery Mechanisms", ACM AsiaCCS, May 2016, 12 pages.

\* cited by examiner

ADVERTISEMENT AUDIENCE DYNAMICAL DETECTION CIRCUIT, COMPUTER PROGRAM PRODUCT, AND RELATED METHOD FOR ESTIMATING QUANTITY OF OUT-OF-HOME (OOH) ADVERTISEMENT AUDIENCES PASSING THROUGH SPECIFIC LOCATION IN SPECIFIC TIME PERIOD

CROSS-REFERENCE TO RELATED APPLICATIONS

This application claims the benefit of priority to Patent Application No. 106122022, filed in Taiwan on Jun. 30, 2017; the entirety of which is incorporated herein by reference for all purposes.

BACKGROUND

The disclosure generally relates to an advertisement audience detection device and, more particularly, to an advertisement audience dynamical detection circuit for estimating the quantity of out-of-home (OOH) advertisement audiences passing through a specific location in a specific time period, and related computer program product and method.

As commercial activities grow, various out of home (OOH) advertisements have become more and more popular. For example, plenty of OOH advertisements presented in the form of neon lamps, electronic displays, light boxes, balloons, large inflatable models, flat posters, or other formats can be easily found in various streets, parks, airports, public transportation vehicles, airships, or on the wall of corridors in various buildings.

For advertisers and advertisement agents, the quantity of advertisement audiences is one of the most concerned evaluation factors regarding the effects of advertising. But how to estimate the quantity of advertisement audiences is a very complex issue. The most traditional approach for estimating the quantity of audiences of OOH advertisement is to send personnel to stand beside the OOH advertisement so as to observe, count, and record the number of people watching the OOH advertisement. This traditional approach, however, demands too much labor cost and thus is not realistic to be applied for the situation where the advertisements are deployed in many different locations.

One of the newly developed approaches for estimating the quantity of audiences of OOH advertisement is to install cameras and a computer in the location of OOH advertisement so as to utilize image recognition technology to real-time detect the face or appearance features of the advertisement audiences in order to count and record the number of people watching the OOH advertisement. However, this approach requires the use of cameras, computers, and complex image recognition algorithms, but the detection range (or angle) of the camera is very limited. Therefore, this approach not only demands considerable hardware cost, but also results in poor detection accuracy. In addition, such approach is not suitable to be applied for the situation where the advertisements are deployed in many different locations.

SUMMARY

An example embodiment of an advertisement audience dynamical detection circuit for estimating a quantity of OOH (out-of-home) advertisement audiences passing through a specific location in a specific time period is disclosed. The advertisement audience dynamical detection circuit comprises: a wireless receiving circuit; a storage device, arranged to operably store a computer program product; and a processing circuit, coupled with the wireless receiving circuit and the storage device, arranged to operably execute the computer program product to perform following operations: utilizing the wireless receiving circuit to receive a target probe request frame transmitted by other wireless communication devices; recording an arrival time of the target probe request frame; inspecting a frame field configuration of the target probe request frame; allocating the target probe request frame to a corresponding data group according to the arrival time and the frame field configuration of the probe request frame and a sequence control value in a header of the probe request frame while ensuring that all probe request frames in a same data group have same frame field configuration, an arrival time difference between two newest probe request frames in a same data group is less than a first predetermined value, and a sequence control value difference between two newest probe request frames in a same data group is less than a second predetermined value; and calculating an estimated quantity of OOH advertisement audiences passing through a specific location in a specific time period based on a total quantity of resulting data groups.

An example embodiment of a computer program product stored in a storage device of an advertisement audience dynamical detection circuit is disclosed. The computer program product enables the advertisement audience dynamical detection circuit to perform an OOH advertisement audience quantity detecting operation, and the OOH advertisement audience quantity detecting operation comprises: utilizing a wireless receiving circuit to receive a target probe request frame transmitted by other wireless communication devices; recording an arrival time of the target probe request frame; inspecting a frame field configuration of the target probe request frame; allocating the target probe request frame to a corresponding data group according to the arrival time and the frame field configuration of the probe request frame and a sequence control value in a header of the probe request frame while ensuring that all probe request frames in a same data group have same frame field configuration, an arrival time difference between two newest probe request frames in a same data group is less than a first predetermined value, and a sequence control value difference between two newest probe request frames in a same data group is less than a second predetermined value; and calculating an estimated quantity of OOH advertisement audiences passing through a specific location in a specific time period based on a total quantity of resulting data groups.

An example embodiment of an OOH advertisement audience quantity detecting method is disclosed, comprising: utilizing a wireless receiving circuit to receive a target probe request frame transmitted by other wireless communication devices; recording an arrival time of the target probe request frame; inspecting a frame field configuration of the target probe request frame; allocating the target probe request frame to a corresponding data group according to the arrival time and the frame field configuration of the probe request frame and a sequence control value in a header of the probe request frame while ensuring that all probe request frames in a same data group have same frame field configuration, an arrival time difference between two newest probe request frames in a same data group is less than a first predetermined value, and a sequence control value difference between two newest probe request frames in a same data group is less than a second predetermined value; and calculating an estimated quantity of OOH advertisement audiences passing through a specific location in a specific time period based on a total quantity of resulting data groups.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
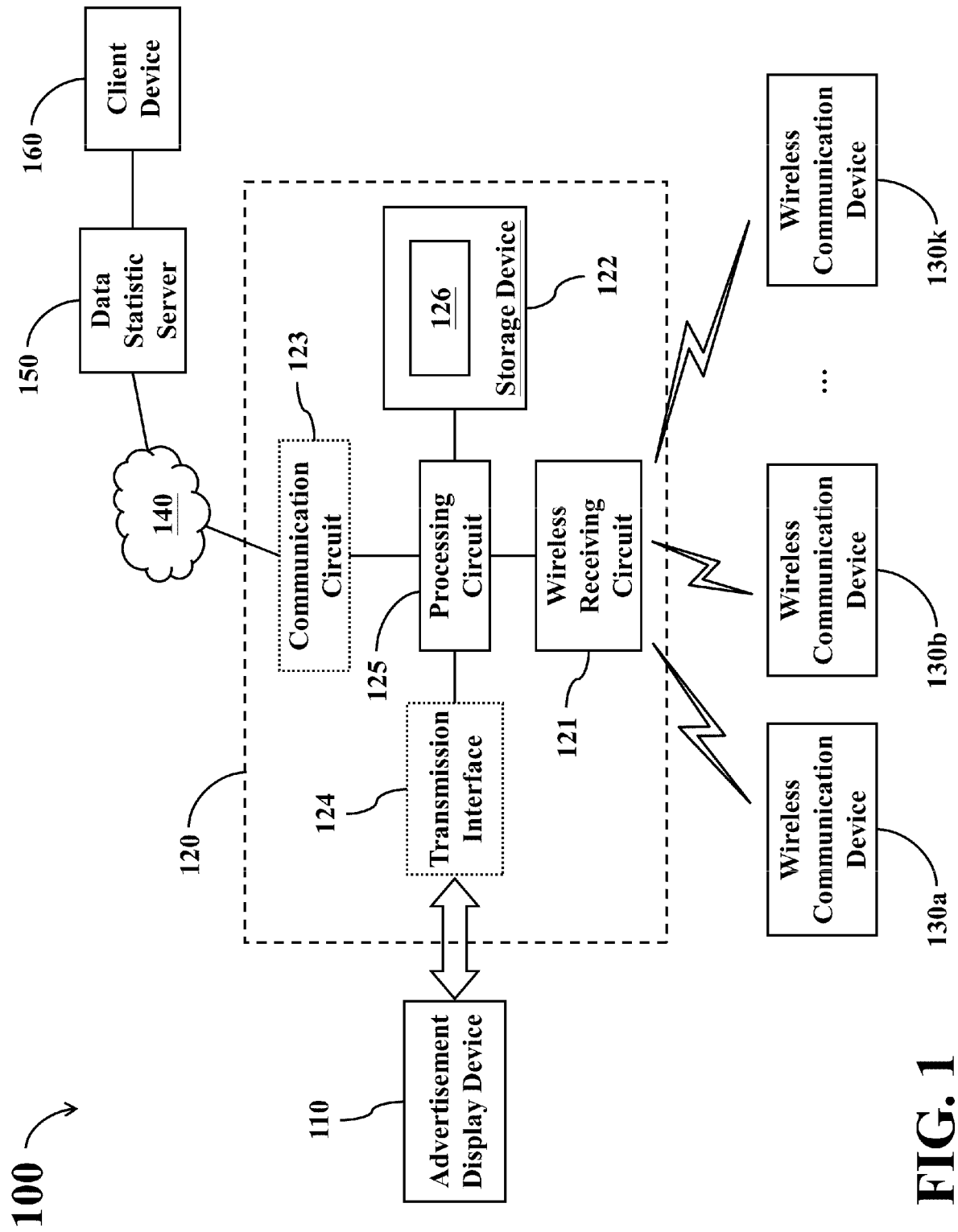
FIG. 1 shows a simplified functional block diagram of an OOH adverting system according to one embodiment of the present disclosure.

FIG. 1 shows a simplified functional block diagram of an OOH (out-of-home) adverting system 100 according to one embodiment of the present disclosure. The out-of-home advertising system 100 comprises an advertisement display device 110, an advertisement audience dynamical detection circuit 120, multiple wireless communication devices (e.g., the exemplary wireless communication devices 130a~130k shown in FIG. 1), a remote data statistic server 150, and one or more client devices (e.g., the exemplary client device 160 shown in FIG. 1). As shown in FIG. 1, the advertisement audience dynamical detection circuit 120 of this embodiment comprises a wireless receiving circuit 121, a storage device 122, a communication circuit 123, a transmission interface 124, and a processing circuit 125, wherein the storage device 122 is stored with an OOH advertisement audience quantity detection program 126.

Throughout the specification and drawings, indexes a~k may be used in the reference numbers of some devices for ease of referring to respective devices. The use of indexes a~k does not intend to restrict the amount of related devices to any specific number.

In the embodiment of FIG. 1, the advertisement display device 110 may be realized with various electronic devices capable of showing the content of the OOH advertisement. For example, the advertisement display device 110 may be realized with neon lamps, electronic displays, light boxes, audio players, or the like. The advertisement audience dynamical detection circuit 120 is coupled with the advertisement display device 110 and arranged to operably estimate the quantity of OOH advertisement audiences (i.e., audiences of the OOH advertisement) passing through a specific location in a specific time period. In other words, the advertisement display device 110 and the advertisement audience dynamical detection circuit 120 are positioned at the same location or to near each other.

In the advertisement audience dynamical detection circuit 120, the wireless receiving circuit 121 is arranged to operably receive probe request frames transmitted from multiple wireless communication devices located near the wireless receiving circuit 121. The communication circuit 123 is arranged to operably communicate various data or instructions with the remote data statistic server 150 through the network 140 or other data transmission channels. The transmission interface 124 may be connected to an appropriate interface of the advertisement display device 110 so as to communicate various data or instructions with the advertisement display device 110, and/or to receive power required for the operations of the advertisement audience dynamical detection circuit 120 from the advertisement display device 110. The processing circuit 125 is coupled with the wireless receiving circuit 121, the storage device 122, the communication circuit 123, and the transmission interface 124. The processing circuit 125 is arranged to operably execute the OOH advertisement audience quantity detection program 126 stored in the storage device 122 to perform an OOH advertisement audience quantity detecting operation.

In practice, the wireless receiving circuit 121 may be realized with various signal receiving circuits complying with the 802.11 Series wireless communication protocols. The communication circuit 123 may be realized with various appropriate circuits complying with related networking communication protocols, wireless communication protocols, or mobile communication protocols, such as network interface cards (NIC), Wi-Fi circuits, or mobile communication circuits. The transmission interface 124 may be realized with various signal interface circuits complying with related networking communication protocols, wired communication protocols, or wireless communication protocols. For example, depending upon the communication manner adopted to communicate with the advertisement display device 110, the transmission interface 124 may comprise an USB (Universal Serial Bus) interface, an UART (Universal Asynchronous Receiver/Transmitter) interface, a SATA (Serial Advanced Technology Attachment) interface, a PCI (Peripheral Component Interconnect) interface, a PCI-E (Peripheral Component Interconnect Express) interface, a NIC (Network Interface Card) interface, a Wi-Fi interface, a Bluetooth interface, a BLE (Bluetooth Low Energy) interface, or a NFC (Near Field Communication) interface, or may comprise a combination of above interfaces.

Figure 2:
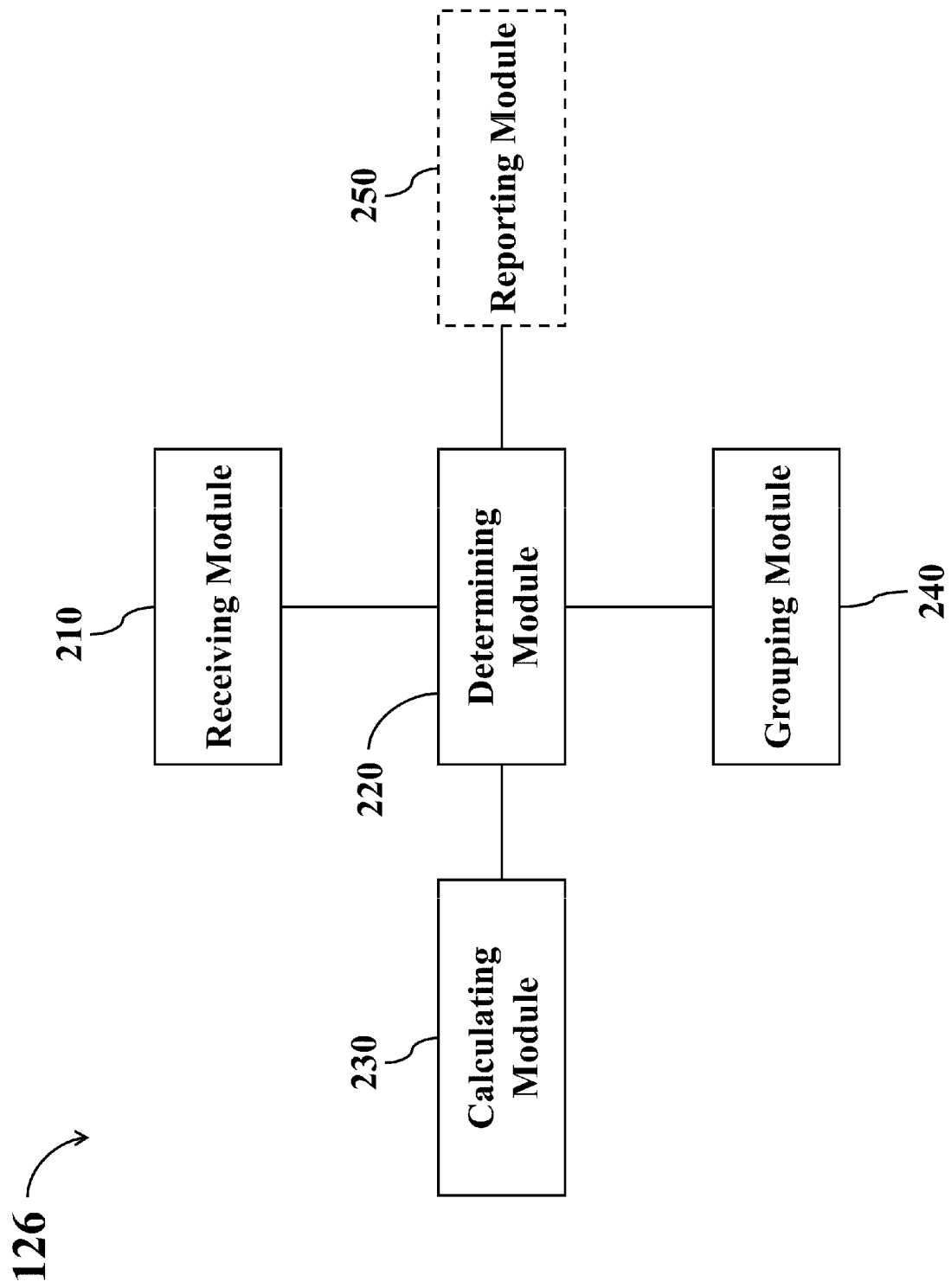
FIG. 2 shows a simplified functional module diagram of a computer program product in an advertisement audience dynamical detection circuit in FIG. 1 according to one embodiment of the present disclosure.

The OOH advertisement audience quantity detection program 126 in the aforementioned advertisement audience dynamical detection circuit 120 may be realized with a computer program product formed by one or more functional modules. For example, FIG. 2 shows a simplified functional module diagram of the OOH advertisement audience quantity detection program 126 in FIG. 1 according to one embodiment of the present disclosure. In the embodiment of FIG. 2, the OOH advertisement audience quantity detection program 126 comprises a receiving module 210, a determining module 220, a calculating module 230, a grouping module 240, and a reporting module 250.

Since wireless communication devices have become more and more popular, most modern people would carry a smartphone, a tablet computer, a notebook computer, or other wireless communication device capable of conducting wireless networking communication when they go to an outdoor venue. Accordingly, if the contents of the wireless network packets transmitted by the wireless communication devices around the advertising location can be employed to identify the source device of the wireless network packets, then the quantity of OOH advertisement audiences appear in the advertising location may be estimated based on the total number of the identified source devices of the wireless network packets.

In the beginning, the wireless communication devices of various vendors typically adopt a real MAC address mechanism. That is, the source MAC address in the wireless network packet generated by the wireless communication device is the real hardware address of the wireless communication device, and will not change with time.

As is well known in the art, however, more and more vendors decided to adopt a random MAC address mechanism instead of the real MAC address mechanism in order to enhance the information security of the wireless communication device. That is, the wireless communication device is designed to purposely change the source MAC address in the generated wireless network packets after a short period of time, so as to prevent leakage of the real MAC address of the wireless communication device. In this way, it becomes more difficult for malicious program or hackers to steal user's personal data by sniffing the network packets.

As a result, it becomes impossible to obtain the actual quantity of the wireless communication devices near the advertising location by simply sniffing the wireless network packets around the advertising location. Therefore, the aforementioned advertisement audience dynamical detection circuit 120 adopts a specially-designed detecting method to accurately calculate the actual quantity of the wireless communication devices located near the advertising location, and is thus enabled to estimate the quantity of OOH advertisement audiences based on the actual quantity of the wireless communication devices.

Figure 3:
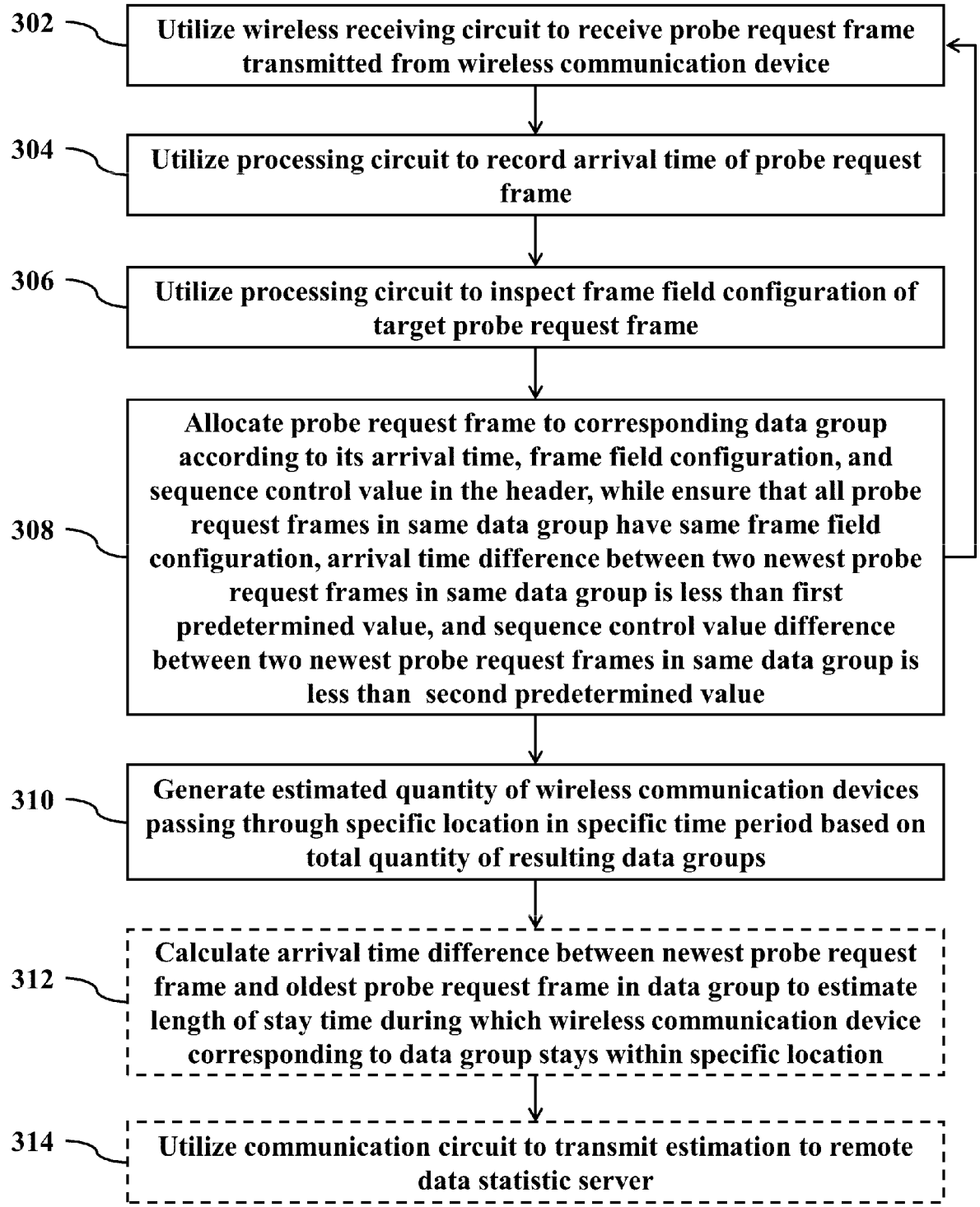
FIG. 3 shows a simplified flowchart of an OOH advertisement audience quantity detecting method according to one embodiment of the present disclosure.
Figure 4:
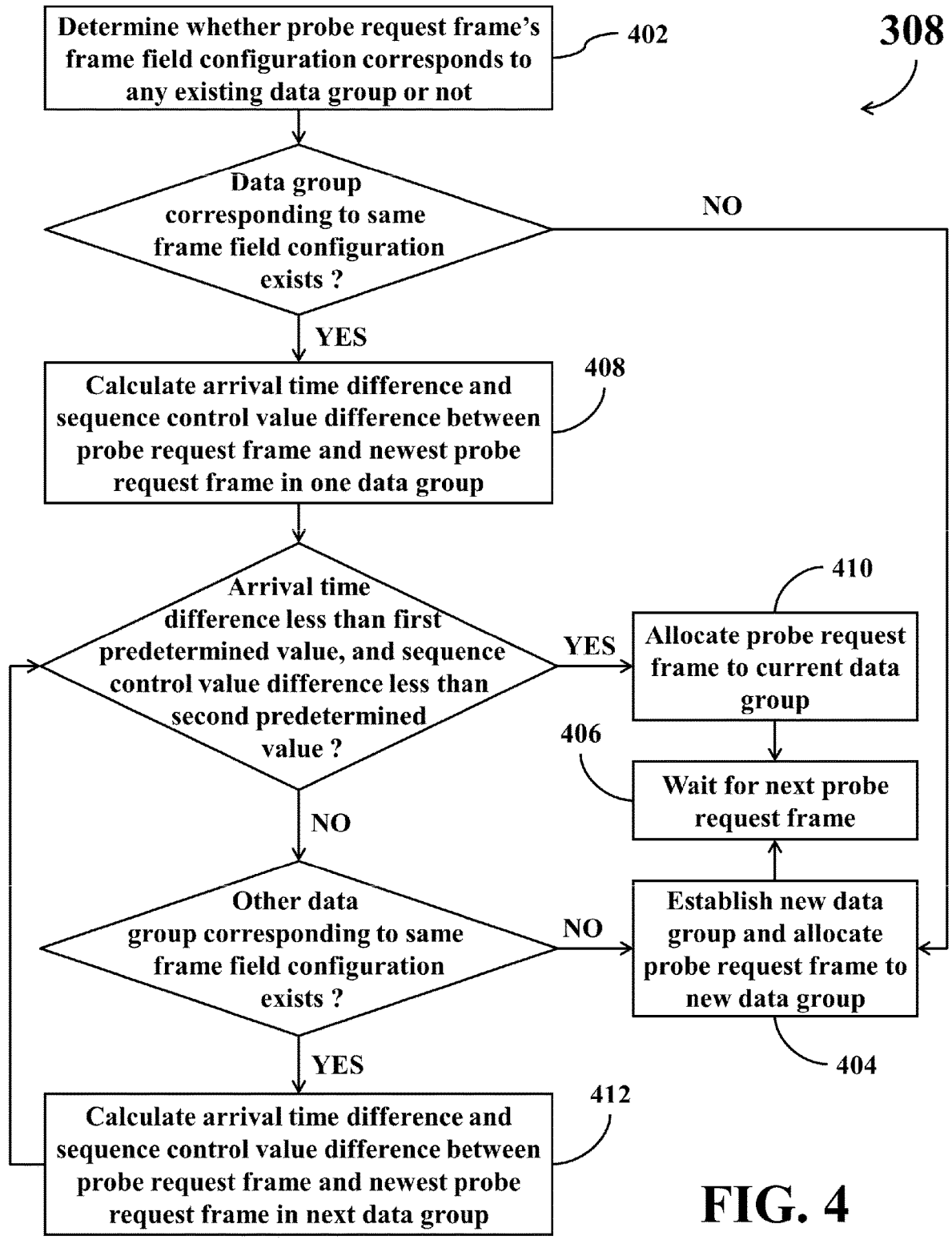
FIG. 4 shows a simplified flowchart of a probe request frame grouping method in FIG. 3 according to one embodiment of the present disclosure.

The operations of the advertisement audience dynamical detection circuit 120 will be further described in the following by reference to FIG. 3 and FIG. 4. FIG. 3 shows a simplified flowchart of an OOH advertisement audience quantity detecting method according to one embodiment of the present disclosure. FIG. 4 shows a simplified flowchart of a probe request frame grouping method in FIG. 3 according to one embodiment of the present disclosure.

In operations, the processing circuit 125 of the advertisement audience dynamical detection circuit 120 executes the OOH advertisement audience quantity detection program 126 stored in the storage device 122 to perform the OOH advertisement audience quantity detecting method of FIG. 3. In this situation, the receiving module 210 may control the processing circuit 125 to configure the wireless receiving circuit 121 to operate in a promiscuous mode or a monitor mode, so as to receive multiple probe request frames PRF_A~PRF_Q transmitted from other wireless communication devices 130a~130k near the advertisement audience dynamical detection circuit 120. Please note that, throughout the specification and drawings, the indexes a~k in the reference numbers of some probe request frames are used for ease of referring to respective probe request frames, and do not intend to restrict the amount of the probe request frames to any particular number.

The determining module 220 of the OOH advertisement audience quantity detection program 126 may flexibly configure the beginning time and end time for each specific time period in the OOH advertisement audience quantity detecting operation. In practice, all specific time periods may be configured to have the same length of time. Alternatively, the specific time period with respect to the morning time may be configured to have a different length of time in compared to that with respect to the afternoon time. Similarly, the specific time period with respect to the day time may be configured to have a different length of time in compared to that with respect to the afternoon time.

In each specific time period configured by the determining module 220, the advertisement audience dynamical detection circuit 120 may repeat the operations 302 through 308 in FIG. 3.

In the operation 302, the receiving module 210 may control the processing circuit 125 to utilize the wireless receiving circuit 121 to receive a probe request frame (hereinafter, a target probe request frame) transmitted from one of the other wireless communication devices 130a~130k near the advertisement audience dynamical detection circuit 120.

In the operation 304, the receiving module 210 may control the processing circuit 125 to record the arrival time of the target probe request frame. Please note that the term "arrival time" used throughout the specification and claims refers to the actual time at which the target probe request frame is received by the wireless receiving circuit 121, rather than the time value recorded in the timestamp filed of the target probe request frame.

In the operation 306, the determining module 220 may control the processing circuit 125 to inspect the frame field configuration of the target probe request frame.

The term "frame field configuration" used throughout the specification and claims refers to the configuration features of the total field quantity of one or more predetermined tagged parameter fields in the frame body of each probe request frame, the arrangement of the one or more predetermined tagged parameter fields, the total field length of the one or more predetermined tagged parameter fields, and/or the respective field length of the one or more predetermined tagged parameter fields. But the term "frame field configuration" is not relevant to the contents recorded in those tagged parameter fields. The aforementioned arrangement of the tagged parameter fields refers to the positions and/or order of those tagged parameter fields in the frame body.

In accordance with related specifications of general wireless communication protocols, the frame body of each probe request frame typically comprises many tagged parameter fields, such as the SSID field, the Supported Rates field, the Extended Supported Rates field, the FH Parameter Set field, the DS Parameter Set field, the CF Parameter Set field, the TIM field, the IBSS Parameter Set field, the HT Capabilities field, the Extended HT Capabilities field, and one or more non-mandatory Vendor Specific fields.

By collecting and analyzing massive data, it is founded that the frame field configuration (e.g., the total field quantity, the arrangement, the total field length, and/or the respective field length) of certain tagged parameter fields in the probe request frames generated by a wireless communications device is typically consistent with that of other wireless communications devices of the same vendor. On the contrary, the above frame field configuration of the probe request frames generated by a wireless communications device typically differs from that of other wireless communications devices of different vendors.

Different wireless communication devices have different penetration rates in different countries or different geographical regions. Therefore, depending on the country or geographical region where the out-of-home advertising system 100 is going to be applied, some or all of the tagged parameter fields that possibly present in a probe request frame may be selected as the predetermined tagged parameter fields to be inspected by the processing circuit 125 in the operation 306.

In one embodiment, for example, the predetermined tagged parameter field refers to one or more vendor specific fields in the probe request frame.

In another embodiment, the predetermined tagged parameter field refers to a combination of one or more vendor specific fields in the probe request frame and at least one of the Supported Rates field, the Extended Supported Rates field, the FH Parameter Set field in the probe request frame.

Please note that the determining module 220 only needs to inspect the frame field configuration of the target probe request frame in the above operation 306, and does not need to read the contents in the predetermined tagged parameter fields.

In the operation 308, the grouping module 240 and the calculating module 230 control the processing circuit 125 to allocate the target probe request frame to a corresponding data group according to the arrival time of the target probe request frame, the frame field configuration of the target probe request frame, and a sequence control value in the header of the target probe request frame. When allocating the target probe request frame to a corresponding data group, the processing circuit 125 also ensures that all probe request frames in a same data group have the same frame field configuration, an arrival time difference between two newest probe request frames in a same data group is less than a first predetermined value, and a sequence control value difference between two newest probe request frames in a same data group is less than a second predetermined value. In this embodiment, each data group is a virtual group that corresponds to a particular frame field configuration.

In operations, the receiving module 210, the determining module 220, the calculating module 230, and the grouping module 240 repeat the above operations 302 through 308 for each of other probe request frames received by the wireless receiving circuit 121, so as to successively establish multiple data groups by respectively allocating multiple probe request frames received by the wireless receiving circuit 121 to their corresponding data groups.

When the specific time period configured by the determining module 220 ends, the advertisement audience dynamical detection circuit 120 may perform the operation 310 in FIG. 3.

In the operation 310, the calculating module 230 controls the processing circuit 125 to generate an estimated quantity of wireless communication devices passing through the advertising location in the above specific time period based on the total quantity of resulting data groups. In this embodiment, the calculating module 230 determines that the probe request frames allocated to a same data group were generated by a same wireless communication device, and determines that two robe request frames respectively allocated to different data groups were generated by different wireless communication devices. The calculating module 230 may simply utilize the total quantity of established data groups as the estimated quantity of wireless communication devices passing through the advertising location in the above specific time period. Then, the determining module 220 may control the processing circuit 125 to calculate an estimated quantity of OOH advertisement audiences passing through the above specific location (i.e., the advertising location) in the above specific time period based on the resulting estimated quantity of wireless communication devices.

For example, the determining module 220 may control the processing circuit 125 to directly utilize the resulting estimated quantity of wireless communication devices as the estimated quantity of OOH advertisement audiences. Alternatively, the determining module 220 may control the processing circuit 125 to conduct a weight blending operation on the estimated quantity of wireless communication devices so as to generate a corresponding estimated quantity of the OOH advertisement audiences.

In the operation 312, the calculating module 230 controls the processing circuit 125 to calculate the arrival time difference between the newest probe request frame and the oldest probe request frame in a target data group to estimate a length of stay time during which a wireless communication device corresponding to the target data group stays within the specific location, i.e., the wireless signal reception range of the wireless receiving circuit 121. For example, the calculating module 230 may control the processing circuit 125 to simply utilize the resulting arrival time difference as the estimated length of stay time during which the wireless communication device corresponding to the target data group stays within the specific location. Alternatively, the calculating module 230 may control the processing circuit 125 to conduct a weight blending operation on the resulting arrival time difference to generate the estimated length of stay time during which the wireless communication device corresponding to the target data group stays within the specific location.

By performing the aforementioned operation 312, the calculating module 230 is enabled to control the processing circuit 125 to estimate the length of stay time within the specific location for respective wireless communication devices.

In the operation 314, the reporting module 250 controls the processing circuit 125 to utilize the communication circuit 123 to transmit the estimated quantity of OOH advertisement audiences passing through the specific location in the above specific time period as well as the estimated length of stay time within the specific location of respective wireless communication devices to a remote data statistic server 150 through the network.

Based on the data transmitted from the advertisement audience dynamical detection circuit 120, the remote data statistic server 150 may conduct a benefit analysis for the OOH advertising, a people flow analysis for the specific location, and/or offline customer preference analysis, and then transmit the analysis results to the client device 160 through the network or other suitable data transmission approach, so that the advertisers or advertisement agents can obtain related analysis results.

The method for grouping the probe request frames in the aforementioned operation 308 will be further described in the following by reference to FIG. 4.

As shown in FIG. 4, when the advertisement audience dynamical detection circuit 120 performs the operation 308 for the target probe request frame, it performs the operation 402 first. In the operation 402, the grouping module 240 controls the processing circuit 125 to determine whether the frame field configuration of the target probe request frame corresponds to any existing data group or not.

If the processing circuit 125 determines that there is no existing data group corresponds to the frame field configuration of the target probe request frame, the advertisement audience dynamical detection circuit 120 would proceed with the operation 404. For example, in the situation where the frame field configurations of all existing data groups established by the grouping module 240 are different from the frame field configuration of the target probe request frame, or in the situation where the grouping module 240 does not yet establish any data group, the advertisement audience dynamical detection circuit 120 would perform the operation 404.

In the operation 404, the grouping module 240 controls the processing circuit 125 to establish a new data group, allocate the target probe request frame to the new data group, and configure the new data group to correspond to an frame field configuration the same as the frame field configuration of the target probe request frame. Then, the grouping module 240 performs the operation 406 to wait for the next probe request frame to which the operation 308 in FIG. 3 should be applied.

On the contrary, if the processing circuit 125 determines that the frame field configuration of the current probe request frame is the same as the frame field configuration corresponding to one or more existing data groups established by the grouping module 240, the advertisement audience dynamical detection circuit 120 would perform the operation 408.

For example, assuming that the aforementioned target probe request frame is the probe request frame PRF_A, and the probe request frame PRF_A is the first probe request frame received by the wireless receiving circuit 121 during the current specific time period. In other words, there is no existing data group before the grouping module 240 controls the processing circuit 125 to perform the operation 308 on the probe request frame PRF_A.

In this situation, when the grouping module 240 controls the processing circuit 125 to perform the operation 402 for the probe request frame PRF_A, the processing circuit 125 would determine that there is no existing data group corresponding to same frame field configuration as the probe request frame PRF_A, and thus it would proceed with the operation 404.

In the operation 404, the grouping module 240 controls the processing circuit 125 to establish a new data group (i.e., the earliest data group established during the current specific time period), allocate the probe request frame PRF_A to the earliest data group, and configure the earliest data group to correspond to a frame field configuration the same as the frame field configuration of the probe request frame PRF_A. For illustrative purpose, the earliest data group is hereinafter referred to as a first data group. For example, the grouping module 240 may assign a first configuration identification code for the frame field configuration of the probe request frame PRF_A, and correlate the first data group with the first configuration identification code.

Then, the grouping module 240 performs the operation 406 to wait for the next probe request frame to which the operation 308 in FIG. 3 should be applied.

For another example, assuming that the aforementioned target probe request frame is the probe request frame PRF_C, and the probe request frame PRF_C is not the first probe request frame received by the wireless receiving circuit 121 during the current specific time period. In other words, there must be one or more data group that have been established before the grouping module 240 controls the processing circuit 125 to perform the operation 308 for the probe request frame PRF_C.

In this situation, when the grouping module 240 controls the processing circuit 125 to perform the operation 402 for the probe request frame PRF_C, if the frame field configuration of the probe request frame PRF_C is the same as the frame field configuration of one or more existing data groups, the advertisement audience dynamical detection circuit 120 would perform the operation 408 for the probe request frame PRF_C. On the contrary, if the frame field configurations corresponding to all existing data groups established by the grouping module 240 are different from the frame field configuration of the probe request frame PRF_C, the grouping module 240 would perform the operation 404.

In the operation 408, the calculating module 230 controls the processing circuit 125 to calculate the arrival time difference and sequence control value difference between the probe request frame PRF_C and the newest probe request frame in a target data group corresponding to the same frame field configuration as the probe request frame PRF_C, and the grouping module 240 then conducts related condition judgements based on the calculation result of the calculating module 230.

If the probe request frame PRF_C matches a first condition and a second condition, the grouping module 240 would perform the operation 410 for the probe request frame PRF_C. The aforementioned first condition specifies that the arrival time difference between the probe request frame PRF_C and the newest probe request frame in the target data group is less than the first predetermined value. The aforementioned second condition specifies that the sequence control value difference between the probe request frame PRF_C and the newest probe request frame in the target data group is less than the second predetermined value.

In the operation 410, the grouping module 240 controls the processing circuit 125 to allocate the probe request frame PRF_C to the current target data group.

For example, assuming that the target data group is the aforementioned first data group (i.e., the data group corresponding to the aforementioned probe request frame PRF_A), and the probe request frame PRF_C matches both the first condition and the second condition, then the processing circuit 125 would allocate the probe request frame PRF_C to the first data group.

If the probe request frame PRF_C does not match at least one of the first condition and the second condition, and there is no other data group corresponding to the same frame field configuration, then the grouping module 240 would perform the operation 404 for the probe request frame PRF_C.

In the operation 404, the grouping module 240 controls the processing circuit 125 to establish a new data group, and allocate the probe request frame PRF_C to the new data group. For example, the grouping module 240 may control the processing circuit 125 to create a second data group different from the aforementioned first data group, allocate the probe request frame PRF_C to the second data group, and configure the frame field configuration corresponding to the second data group to be the same as the frame field configuration of the probe request frame PRF_C. For example, the grouping module 240 may assign a second configuration identification code for the frame field configuration of the probe request frame PRF_C, and correlate the second data group with the second configuration identification code.

It can be appreciated from the foregoing descriptions that the frame field configuration corresponding to the second data group may be the same as the frame field configuration corresponding to the first data group, or may be different form the frame field configuration corresponding to the first data group.

If the probe request frame PRF_C does not match at least one of the first condition or the second condition, but there has other data group corresponding to the same frame field configuration as the probe request frame PRF_C, then the advertisement audience dynamical detection circuit 120 would perform the operation 412 for the probe request frame PRF_C.

In the operation 412, the calculating module 230 controls the processing circuit 125 to calculate the arrival time difference between the probe request frame PRF_C and the newest probe request frame in the next data group corresponding to the same frame field configuration, and to calculate the sequence control value difference between the probe request frame PRF_C and the newest probe request frame in the next data group corresponding to the same frame field configuration.

Then, the grouping module 240 compares the arrival time difference with the aforementioned first predetermined value, and compares the sequence control value difference with the aforementioned second predetermined value, so as to determine whether to allocate the probe request frame PRF_C to the next data group corresponding to the same frame field configuration.

For the purpose of explanatory convenience in the following description, it is assumed hereinafter that the next data group corresponding to the frame field configuration mentioned in the operation 412 is a third data group different from the aforementioned first data group and second data group. Similar with the judgements described previously, if the probe request frame PRF_C matches the first condition and the second condition, the grouping module 240 would control the processing circuit 125 to allocate the probe request frame PRF_C to the third data group. If the probe request frame PRF_C does not match at least one of the first condition and the second condition, the grouping module 240 would check if there has any other data group corresponding to the same frame field configuration. In the case of that there is no other data group corresponding to the same frame field configuration, the grouping module 240 would establish an additional new data group. In the case of that there has a fourth data group corresponding to the same frame field configuration, the grouping module 240 would calculate the arrival time difference and the sequence control value difference between the probe request frame PRF_C and the newest probe request frame in the next data group (e.g., the fourth data group) corresponding to the same frame field configuration.

It can be appreciated from the foregoing descriptions that after the grouping module 240 controls the processing circuit 125 to respectively perform the grouping operation 308 for the multiple probe request frames PRF_A~PRF_Q received by the wireless receiving circuit 121, the grouping module 240 would generate multiple data groups corresponding to different frame field configurations, while ensure that all probe request frames in a same data group have the same frame field configuration, the arrival time difference between two newest probe request frames in a same data group is less than the aforementioned first predetermined value, and the sequence control value difference between two newest probe request frames in a same data group is less than the aforementioned second predetermined value.

In addition, it can also be appreciated from the previous descriptions that two different data groups may respectively correspond to different frame field configurations, and may both correspond to the same frame field configuration.

Although the advertisement audience dynamical detection circuit 120 is unable to directly determine whether the source devices of different probe request frames are the same wireless communication device or not based on the contents of the probe request frames, the advertisement audience dynamical detection circuit 120 still can effectively recognize the real source device of every probe request frame by performing the above operation 308 to group the probe request frames based on their arrival time, frame field configuration, and sequence control value. As a result, it effectively prevents the advertisement audience dynamical detection circuit 120 from erroneously recognizing the same source device as different source devices.

Therefore, the disclosed method for estimating the quantity of OOH advertisement audiences passing through a specific location in a specific time period based on a total quantity of the source devices of the probe request frames is able to obtain an estimation result very close to the real number.

As described previously, the determining module 220 only needs to check the frame field configuration of the target probe request frame in the aforementioned operation 306, and does not need to read the contents recorded in those predetermined tagged parameter fields. Thus, the required computation of the determining module 220 can be minimized. Accordingly, even in the environment having a considerable number of wireless communication devices, the disclosed advertisement audience dynamical detection circuit 120 can still function normally.

Furthermore, since the wireless receiving circuit 121 employed in the advertisement audience dynamical detection circuit 120 has a much lower hardware cost than the traditional camera and has a wider detectable range than the camera, deploying a massive number of the advertisement audience dynamical detection circuit 120 in various OOH advertising applications is much affordable than conventional approaches.

In addition, since the beginning time and end time for each specific time period in the OOH advertisement audience quantity detecting operation can be flexibly configured by the advertisement audience dynamical detection circuit 120, the advertisement audience dynamical detection circuit 120 is enabled to obtain the estimated quantity of OOH advertisement audiences passing through the OOH advertising location in a short period of time (e.g., 10 minutes, 5 minutes, or even 1 minute) by simply configuring the length of the specific time period to be a shorter length. As a result, the advertisement audience dynamical detection circuit 120 is enabled to obtain much detailed and accurate estimation results that cannot be achieved by conventional advertisement audience quantity estimation technologies. Thus, the advertisement audience dynamical detection circuit 120 is significantly beneficial to subsequent benefit analysis for the OOH advertising, people flow analysis with respect to the specific location, and offline customer preference analysis.

From another aspect, the method for estimating the quantity of OOH advertisement audiences described previously does not retrieve or rely on the personal private information stored in respective wireless communication devices, so it does not invade the user's privacy, nor raise any concern of leaking the user's personal private data.

Please note that the executing order of the operations in FIG. 3 and FIG. 4 is merely an exemplary embodiment, rather than a restriction to practical implementations. For example, the executing order of the operations 304 and 306 in FIG. 3 may be swapped, or may be performed simultaneously. In addition, the executing order of the operations 310 and 312 in FIG. 3 may be swapped, or may be performed simultaneously.

In some embodiments, the operation 312 may be omitted.

In some embodiments, the advertisement audience dynamical detection circuit 120 and the remote data statistic server 150 may be integrated together. In this situation, the communication circuit 123 may be omitted.

In some embodiments, the advertisement display device 110 may be instead realized with other electronic devices unable to communicate data with the advertisement audience dynamical detection circuit 120 or unable to transmit power to the advertisement audience dynamical detection circuit 120. The advertisement display device 110 may even be realized with a balloon, a large inflatable model, a flat poster, or other objects for presenting static advertisement contents. In this situation, the transmission interface 124 may be omitted.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. An advertisement audience dynamical detection circuit (120) for estimating a quantity of OOH (out-of-home) advertisement audiences passing through a specific location in a specific time period, the advertisement audience dynamical detection circuit (120) comprising:
   a wireless receiving circuit (121);
   a storage device (122), arranged to operably store a computer program product (126); and
   a processing circuit (125), coupled with the wireless receiving circuit (121) and the storage device (122), arranged to operably execute the computer program product (126) to perform following operations:
   utilizing the wireless receiving circuit (121) to receive a target probe request frame transmitted by other wireless communication devices (130a~130k);
   recording an arrival time of the target probe request frame;
   inspecting a frame field configuration of the target probe request frame;
   allocating the target probe request frame to a corresponding data group according to the arrival time and the frame field configuration of the probe request frame and a sequence control value in a header of the probe request frame while ensuring that all probe request frames in a same data group have same frame field configuration, an arrival time difference between two newest probe request frames in the same data group is less than a first predetermined value, and a sequence control value difference between two newest probe request frames in the same data group is less than a second predetermined value; and
   calculating an estimated quantity of OOH advertisement audiences passing through a specific location in a specific time period based on a total quantity of resulting data groups;
   wherein the operation of allocating the target probe request frame to a corresponding data group performed by the processing circuit (125) comprises:
   calculating an arrival time difference and a sequence control value difference between the target probe request frame and a newest probe request frame in a target data group corresponding to the same frame field configuration as the target probe request frame;
   if the target probe request frame matches a first condition and a second condition, allocating the target probe request frame to the target data group, wherein the first condition specifies that the arrival time difference between the target probe request frame and the newest probe request frame in the target data group is less than the first predetermined value, and the second condition specifies that the sequence control value between the target probe request frame and the newest probe request frame in the target data group is less than the second predetermined value;
   if the target probe request frame does not match either one of the first condition and the second condition and there is no other data group corresponding to the same frame field configuration as the target probe request frame, establishing a new data group and allocating the target probe request frame to the new data group; and
   if the target probe request frame does not match either one of the first condition and the second condition but there is another data group corresponding to the same frame field configuration as the target probe request frame, calculating an arrival time difference between the target probe request frame and a newest probe request frame in next data group corresponding to the same frame field configuration as the target probe request frame and comparing with the first predetermined value, calculating a sequence control value difference between the target probe request frame and the newest probe request frame in the next data group and comparing with the second predetermined value, and determining whether to allocate the target probe request frame to the next data group based on the result of above comparisons.

2. The advertisement audience dynamical detection circuit (120) of claim 1, wherein the frame field configuration of the target probe request frame is selected from a group consisting of following features of one or more predetermined tagged parameter fields in the target probe request frame:
   a total field quantity of the one or more predetermined tagged parameter fields;
   an arrangement of the one or more predetermined tagged parameter fields;
   a total field length of the one or more predetermined tagged parameter fields; and
   respective field length of the one or more predetermined tagged parameter fields.

3. A computer program product (126), embodied on a non-transitory computer readable storage device (122) of an advertisement audience dynamical detection circuit (120), enabling the advertisement audience dynamical detection circuit (120) to perform an OOH (out-of-home) advertisement audience quantity detecting operation, the computer program product comprising computer executable instructions of:

utilizing a wireless receiving circuit (121) to receive a target probe request frame transmitted by other wireless communication devices (130a~130k);

recording an arrival time of the target probe request frame;

inspecting a frame field configuration of the target probe request frame;

allocating the target probe request frame to a corresponding data group according to the arrival time and the frame field configuration of the probe request frame and a sequence control value in a header of the probe request frame while ensuring that all probe request frames in a same data group have same frame field configuration, an arrival time difference between two newest probe request frames in the same data group is less than a first predetermined value, and a sequence control value difference between two newest probe request frames in the same data group is less than a second predetermined value; and calculating an estimated quantity of OOH advertisement audiences passing through a specific location in a specific time period based on a total quantity of resulting data groups;

wherein the operation of allocating the target probe request frame to a corresponding data group comprises:

calculating an arrival time difference and a sequence control value difference between the target probe request frame and a newest probe request frame in a target data group corresponding to the same frame field configuration as the target probe request frame;

if the target probe request frame matches a first condition and a second condition, allocating the target probe request frame to the target data group, wherein the first condition specifies that the arrival time difference between the target probe request frame and the newest probe request frame in the target data group is less than the first predetermined value, and the second condition specifies that the sequence control value between the target probe request frame and the newest probe request frame in the target data group is less than the second predetermined value;

if the target probe request frame does not match either one of the first condition and the second condition and there is no other data group corresponding to the same frame field configuration as the target probe request frame, establishing a new data group and allocating the target probe request frame to the new data group; and if the target probe request frame does not match either one of the first condition and the second condition but there is another data group corresponding to the same frame field configuration as the target probe request frame, calculating an arrival time difference between the target probe request frame and a newest probe request frame in next data group corresponding to the same frame field configuration as the target probe request frame and comparing with the first predetermined value, calculating a sequence control value difference between the target probe request frame and the newest probe request frame in the next data group and comparing with the second predetermined value, and determining whether to allocate the target probe request frame to the next data group based on the result of above comparisons.

4. The computer program product (126) of claim 3, wherein the OOH advertisement audience quantity detecting operation further comprises:

calculating an estimated length of stay time, during which a target source device corresponding to the target data group stays within the specific location, according to an arrival time difference between a newest probe request frame and an oldest probe request frame in the target data group.

5. The computer program product (126) of claim 4, wherein the OOH advertisement audience quantity detecting operation further comprises:

utilizing a communication circuit (123) to transmit the estimated quantity of OOH advertisement audiences and the estimated length of stay time to a remote data statistic server (150).

6. The computer program product (126) of claim 3, wherein a length of the specific time period is less than one minute, and the specific location is within a wireless signal receiving range of the wireless receiving circuit (121).

7. The computer program product (126) of claim 3, wherein the frame field configuration of the target probe request frame is selected from a group consisting of following features of one or more predetermined tagged parameter fields in the target probe request frame:

a total field quantity of the one or more predetermined tagged parameter fields;

an arrangement of the one or more predetermined tagged parameter fields;

a total field length of the one or more predetermined tagged parameter fields; and respective field length of the one or more predetermined tagged parameter fields.

8. The computer program product (126) of claim 7, wherein the one or more predetermined tagged parameter fields comprise one or more vendor specific fields in the target probe request frame.

9. The computer program product (126) of claim 8, wherein the one or more predetermined tagged parameter fields further comprise at least one of a Supported Rates field, an Extended Supported Rates field, a FH (frequency hopping) Parameter Set field, and a HT (high throughout) Capabilities field in the target probe request frame.

10. An OOH (out-of-home) advertisement audience quantity detecting method, comprising:

utilizing a wireless receiving circuit (121) to receive a target probe request frame transmitted by other wireless communication devices (130a~130k);

recording an arrival time of the target probe request frame;

inspecting a frame field configuration of the target probe request frame;

allocating the target probe request frame to a corresponding data group according to the arrival time and the frame field configuration of the probe request frame and a sequence control value in a header of the probe request frame while ensuring that all probe request frames in a same data group have same frame field configuration, an arrival time difference between two newest probe request frames in the same data group is less than a first predetermined value, and a sequence control value difference between two newest probe request frames in the same data group is less than a second predetermined value; and calculating an estimated quantity of OOH advertisement audiences passing through a specific location in a specific time period based on a total quantity of resulting data groups;

wherein the operation of allocating the target probe request frame to a corresponding data group comprises:

calculating an arrival time difference and a sequence control value difference between the target probe request frame and a newest probe request frame in a target data group corresponding to the same frame field configuration as the target probe request frame;

if the target probe request frame matches a first condition and a second condition, allocating the target probe request frame to the target data group, wherein the first condition specifies that the arrival time difference between the target probe request frame and the newest probe request frame in the target data group is less than the first predetermined value, and the second condition specifies that the sequence control value between the target probe request frame and the newest probe request frame in the target data group is less than the second predetermined value;

if the target probe request frame does not match either one of the first condition and the second condition and there is no other data group corresponding to the same frame field configuration as the target probe request frame, establishing a new data group and allocating the target probe request frame to the new data group; and if the target probe request frame does not match either one of the first condition and the second condition but there is another data group corresponding to the same frame field configuration as the target probe request frame, calculating an arrival time difference between the target probe request frame and a newest probe request frame in next data group corresponding to the same frame field configuration as the target probe request frame and comparing with the first predetermined value, calculating a sequence control value difference between the target probe request frame and the newest probe request frame in the next data group and comparing with the second predetermined value, and determining whether to allocate the target probe request frame to the next data group based on the result of above comparisons.

* * * * *